United States Patent [19]
Dublin, Jr.

[11] Patent Number: 6,068,394
[45] Date of Patent: May 30, 2000

[54] METHOD AND APPARATUS FOR PROVIDING DYNAMIC DATA DURING DRILLING

[75] Inventor: W. L. Dublin, Jr., Georgetown, Tex.

[73] Assignee: Industrial Sensors & Instrument, Round Rock, Tex.

[21] Appl. No.: 08/542,073

[22] Filed: Oct. 12, 1995

[51] Int. Cl.$^7$ .................. G01L 1/06; E21B 12/02
[52] U.S. Cl. ............. 364/508; 340/853.1; 340/853.2; 340/856.3; 175/39; 175/40; 73/152.01; 73/152.03; 73/152.43; 33/300; 33/304
[58] Field of Search ................. 364/505, 506, 364/508; 73/152.01, 152.03, 152.19, 152.43, 152.49, 152.51; 33/300, 304, 340, 343; 175/24, 26, 39, 40, 55, 106, 263, 327, 44, 45, 73; 340/853.1, 853.2, 856.3, 870.16

[56] References Cited

U.S. PATENT DOCUMENTS

| | | | |
|---|---|---|---|
| 4,324,297 | 4/1982 | Denison | 175/45 |
| 4,359,898 | 11/1982 | Tanguy et al. | 73/151 |
| 4,359,899 | 11/1982 | Tanguy et al. | |
| 4,733,733 | 3/1988 | Bradley et al. | 175/45 |
| 4,811,597 | 3/1989 | Hebel | 73/151 |
| 4,821,563 | 4/1989 | Maron | 73/151 |
| 4,958,517 | 9/1990 | Maron | 73/151 |
| 5,163,521 | 11/1992 | Pustansyk et al. | 175/40 |
| 5,202,681 | 4/1993 | Dublin, Jr. et al. | 340/856.4 |
| 5,386,724 | 2/1995 | Das et al. | |
| 5,448,227 | 9/1995 | Orban et al. | 340/854.4 |

Primary Examiner—Emanuel T. Voeltz
Assistant Examiner—Tuan Q. Dam
Attorney, Agent, or Firm—Gunn & Associates

[57] ABSTRACT

The present disclosure is directed to both a method and apparatus for providing data dynamically during the drilling of a borehole. This invention can be used with drilling apparatus which is commonly used to drill oil or gas wells, including wells which are vertically drilled or highly deviated wells. The invention provides measures of weight on the drill bit and other forces acting on a drill stem in the vicinity of the drill bit. The present invention is incorporated within the drill stem, which is powered from the surface by a typical rotary drilling rig. The associated drilling apparatus, however, further includes and incorporates a mud motor cooperating with a bent subsection of the sort normally used in drilling a borehole which deviates from the vertical. The downhole element of the invention consists of a subsection which is affixed in the drill stem in the vicinity of the drill bit, and preferably immediately above the drill bit. In one embodiment of the invention, the downhole subsection includes one or more recessed chambers which define a flat faces parallel to the longitudinal axis of the subsection at the interior which is immediately adjacent to a relatively thin portion of the wall of the subsection. The thin portions or "diaphragms" are stressed as the subsection is loaded by forces in the vicinity of the drill bit. The diaphragms acts as collectors for the discrete strains generated by the nominally squared discontinuities. Consequently, strain gauges affixed to the one or more diaphragms provide output signals proportional to stress from which various force components can be uniquely determined.

33 Claims, 6 Drawing Sheets

METHOD AND APPARATUS FOR PROVIDING DYNAMIC DATA DURING DRILLING

BACKGROUND OF THE DISCLOSURE

The present disclosure is directed to both a method and apparatus for providing data both and dynamically during the drilling process. This can be used with drilling apparatus which is drilling an oil or gas well including wells which are vertically drilled or highly deviated wells. It can be used with conventional surface powered drilling systems meaning those which incorporate the traditional drilling rig providing power to the drill stem through a rotary table (via a kelly) or it can also be used with similar drilling equipment using a mud motor in the drill stem located just above the drill bit. It is a device and system which provides the weight on the bit (sometimes WOB hereinafter) and other forces acting on the drill stem in the vicinity of the drill bit. The present apparatus is described in the context of a drill stem which is powered from the surface by a typical rotary drilling rig. The equipment, however, further includes and incorporates a mud motor cooperating with a bent sub of the sort normally used in drilling a deviated well so that the variety of circumstances in which the WOB and other forces are measured can be exemplified.

Consider a typical well to be drilled, perhaps one of average depth. Wells drilled in Texas have averaged about 12,000 feet in depth. A well of that depth involves the assembly of a drill stem which is made up of a string of drill pipe. The drill pipe is connected to one or more drill collars and then in turn connect with a drill bit which is placed at the bottom of the drill stem. Historically, the vast majority of continental drilling has been vertical. This is no longer true. Presently, a significant percentage of continental wells are highly deviated or even horizontal. Deviated onshore drilling has gained in popularity in order to take advantage of natural fracture systems which act as a network of fluid conduits in some hydrocarbon bearing reservoirs. These natural fracture systems, if properly intersected with a deviated directional boreholes, can increase the probability of a producing wells and also increase the production rate of producing wells. In many areas of the world, offshore wells are also drilled directionally to take advantage of naturally occurring fractured zones. Even in unconsolidated target formations such as many producing zones in the Gulf of Mexico, offshore drilling involves deviated wells so that several wells can be brought to a single wellhead location type well at an offshore platform. Both onshore and offshore, directional drilling is of great commercial importance in the present day exploration and production of hydrocarbons.

Drilling efficiency can be greatly improved if the driller has real time access to a measure of the force components acting upon the drill string. The present invention is directed toward improving drilling operations and more specifically improving the efficiency of directional drilling operations by measuring axial force, torque, bending moment and shear force components acting upon the drill string in the vicinity of the drill bit. These measurements are suitable for transmission to the surface of the earth in real time. The invention contemplates the use of a cylindrical subsection of the drill string, or "sub", which is placed in the drill string immediately above the drill bit to measure strains resulting from the plurality of forces acting in the vicinity of the drill bit. In particular, the WOB is one parameter which is important to the control of the drilling process. The weight substantially impacts the performance of the drilling process. For instance, the weight must be controlled so that the drill bit is provided with weight in a selected range for proper operation. If the weight is excessive, it tends to damage the drill bit. If the weight is below the desired range, the rate of penetration might be reduced. The bite of the drill bit into the formation is dependent on a number of variables including the speed of rotation, the type of drill bit, the physical characteristics of the formation being penetrated, and most especially the weight dynamically experienced at the drill bit during the drilling process. It is therefore important to measure WOB. A knowledge of other forces experienced by the drill string in the vicinity of the drill bit is likewise important to the driller. Torque is probably the most important parameter when diamond or PDC type drill bits are employed. As an example, an abnormally large torque may indicate excessive bit wear or that the WOB is improper for the formation being penetrated. The summation of oscillatory plus mean torque should be kept positive to prevent tensile stress in the PDC elements that would cause their fracture. Instances where the drill bit is literally supported by the fluid pressure at a level above the bottom of the hole, which is known as "pump off", is best detected by a measure of torque. Excessive shear forces may indicate that a salt formation is being penetrated and that the drilling fluid composition is not proper for this phase of the drilling program. An excessive pressure indication usually indicates that a high pressure zone is being penetrated and may indicate the need to adjust the weight of the drilling fluid to compensate for the increase in downhole pressure. Finally, unexpected bending forces may be indicative that the deviated drilling program is not proceeding according to plan.

The present system recognizes that all forces acting upon the drill string are dynamic and vary depending upon the circumstances. In the most simple case, the WOB is substantially a function of the depth of the drill bit in the borehole when the well is substantially vertical, assuming that there is little snagging of the drill string in the borehole and there is minimal variation in the drill bit as it rides on the face of the drilled well borehole. In practice a portion of the drill string weight is reacted by the drilling rig draw works in order to keep the WOB at its optimum value. The draw works reactance force is adjusted using the weight of the drill string in the borehole and the buoyancy of the drill string. In theory, drill string weight can be estimated rather accurately by knowing the drill pipe schedule. Specific weights are known for the drill collars, drill pipe and respective lengths thereof. If ten drill collars are incorporated totaling 300 feet in length, the weight attributable to the drill collars can be quickly determined. Likewise, the weight of the drill string can be determined quite easily. Drill string buoyancy can also be estimated using the density of the drilling fluid. Under the most ideal conditions, the WOB can, in principle, be determined and controlled by adjusting the reactance of the draw works as a function of the weight of the drill string in the borehole and the drill string buoyancy. While that simplified circumstance is common, it does not always provide the correct answer. The actual WOB will vary for a variety of conditions and circumstances as will other forces acting on the drill string.

One instance in which the WOB varies significantly from the weight of the drill stem is when the well is deviated from the vertical. At this juncture, the well is no longer a simplified vertical hole in which all the weight of the drill stem rests on the drill bit. Rather, the drill stem in some part will be on its side. This reduces the WOB. Even with wells that are more or less vertical, it is possible that some of the weight is held up by contact between the opened hole and the drill string uphole from the drill bit. As an example, modest deviations that give rise to the sticking of the drill pipe or "key slotting" may create an interference in the open well borehole which holds up the drill string and supports a part of the weight, thereby reducing the actual WOB.

Another aspect of drilling a deviated well arises from the situation in which the WOB is distorted with rotation. This provides a modulation of the WOB as measurements are made dependent on movement of the measuring device from the low side to the high side of the deviated borehole. The present disclosures sets forth a method and apparatus for dynamically measuring the axial force indicative of WOB, as well as other forces, by utilizing multiple sensors arranged around a drill string sub located just above the drill bit. The undulations provide a modulated variation on the signal so that the deviated well modulations can be recognized, and the average value of WOB as well as other forces can determined. As mentioned previously, other types of distortion in the process may occur. For instance, the WOB as sensed just above the drill bit may vary with ambient pressure in the drill stem. Recall that drilling fluid or "mud" is normally pumped under pressure from the surface through the drill stem to flow out of the drill bit and return to the surface by way of the annulus between the drill string and the borehole wall. The drilling mud removes cuttings, lubricates the bit, cools the bit and serves to balance the pressure of the formations penetrated.

In another aspect, the weight on bit may also be altered, as the drill bit rotates, as a result of shear stresses created. If the drill bit is dynamically pushed to the side, so to speak, a shear force at right angles to the axis of the drill stem is created. The shear forces on the bit and the bending stress in the stem are direct measures of steering deviations. These factors can be recognized and controlled in the drilling program to provide the desired path of the borehole.

In summary, a variety of difficulties can arise in the drilling of a well. Many of these difficulties can not be predicted yet they greatly affect the efficiency and even the safety of the drilling operation. Measures of forces acting upon the drill string in the vicinity of the drill bit, if made while drilling, can be used to maximize drilling efficiency. The present disclosure thus sets forth a means and mechanism for measuring strains resulting from these forces.

BRIEF SUMMARY OF THE PRESENT DISCLOSURE

The present disclosure is briefly summarized as a device affixed in a drill stem just above the drill bit, preferably immediately above the drill bit. In the preferred form, it comprises a very short sub with pin and box connections immediately above the drill bit. The sub is connected to electronics that may be in a separate sub which provides power, control circuitry and telemetry to the surface. In one embodiment of the invention, the sub includes one or more recessed chambers which define a flat face parallel to the longitudinal axis of the sub at the interior which is immediately adjacent to a relatively thin portion of the wall of the sub. The thin portion or "diaphragm" is stressed as the sub is loaded by forces in the vicinity of the drill bit. The diaphragm acts as collectors for the discrete strains generated by the nominally squared discontinuities. Consequently, strain gauges affixed to the one or more diaphragms provide output signals proportional to stress from which various force components can be discretely determined. This embodiment of the invention will be referred to as the diaphragm sensor embodiment.

A second embodiment, referred to as the full penetration strain sensor, utilizes preferably square recesses which fully penetrate the wall of the sub. Strain gauges are affixed to flattened corners of the recesses and are used to measure distortions of the recesses induced by various force moment components. Force components of interest are isolated and quantified.

The diaphragm sensor embodiment will be summarized first. Ideally, while one or two diaphragms are sufficient to uniquely identify a given force component, simultaneous measures of multiple force components can be obtained by utilization of a plurality of diaphragms and accompanying strain gauges angular spaced around the sub. At each diaphragm location, one or more strain gauges can be installed. The measure of most components ideally use diametrically opposed diaphragms with each diaphragm containing two strain gauges bonded thereto with the strain gauges being wired into a Wheatstone bridge circuit. An external housing tube is preferred to isolate the cavity from the external environment. As an alternate embodiment, a plug is positioned to isolate a small chamber which is preferably hermetically sealed.

The shape of each discontinuity forming each diaphragm is preferably square. The orientation of each diaphragm is selected such that the particular force component of interest distorts the nominally square discontinuity into a parallelogram configuration. Since the degree of distortion is related to the magnitude of the distorting force, a measure of distortion by the strain gauges affixed to each diaphragm can be related to the magnitude of the distorting force component.

Attention is now directed to the full penetration strain sensor embodiment. Many of the basic concepts applied to the diaphragm sensor embodiment are also applied to the full penetration strain sensor embodiment. Recesses or inserts are positioned along a tubular sub in the vicinity of the drill bit. The recesses are preferably arranged in diametrically opposing pairs, are preferably square, and may have a plurality of strain gauges affixed to flattened corners of the recesses. Forces acting upon the drill string in the vicinity of the drill bit generate discretely oriented principal stresses and strains that distort the square recesses. The strain gauges cooperating with a Wheatstone bridge circuit are used to measure the recess distortions. By selecting the orientation of the strain gauges, the wiring of these strain gauges to the Wheatstone bridge circuit, and the orientation of the recesses with respect to the axis of the sub, the various force components of interest are isolated and quantified.

As mentioned previously, it is desirable to determine the force components acting upon the drill string in real time during the drilling operation so that appropriate adjustments in the drilling program can be implemented. This, of course, requires that data from the strain gauges be telemetered to the surface of the earth during the drilling operation. Various measurement-while-drilling (MWD) telemetry systems have been proposed. These include "wireless" systems based on acoustic and electromagnetic communication means between the downhole measuring device and the surface. Pulsing of the drilling fluid column is also a common basis for a MWD telemetry system. If the drill string is not rotating, either electrical or fiber optic wirelines can be used as a data communication link between the downhole sensors and the surface. Alternately, electrical or fiber optic slip rings can be uses to couple a rotating sensor sub with a fixed electrical or fiber optic wireline, respectively.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting to its scope, for the invention may admit to other equally effective embodiments.

DETAILED DESCRIPTION FOR THE PREFERRED EMBODIMENTS

Figure 1:
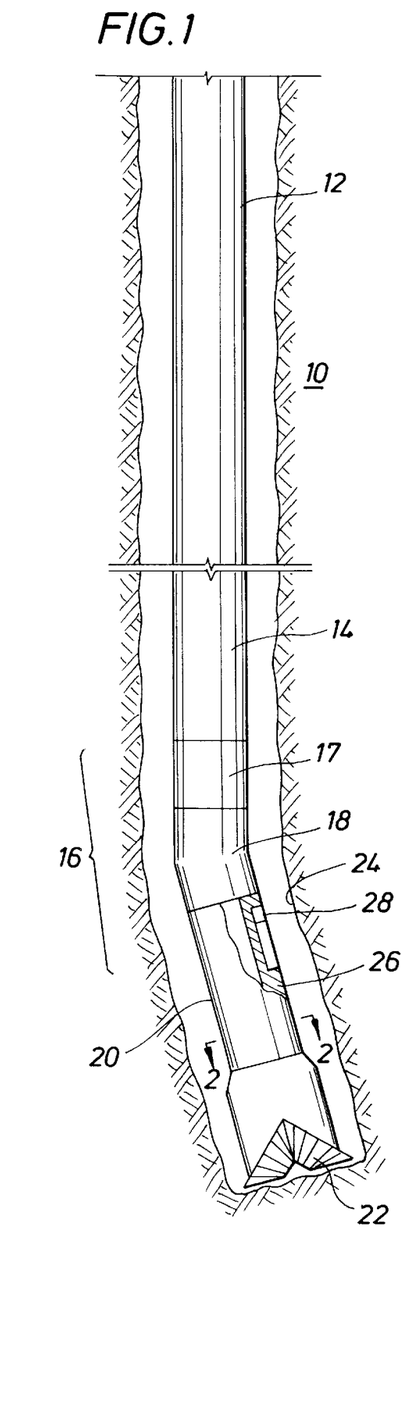
FIG. 1 is a view of a drill string in an idealized well borehole showing a sensor sub mounted above the drill bit and below the drill collars, mud motor and a bent portion of sub which contains the mud motor.

Attention is first directed to FIG. 1 of the drawings where the numeral 10 identifies a drill stem which is intended for use in drilling an oil or gas well. The drill stem, preceding from the top, incorporates a string of drill pipe, representing typically several hundred joints, the pipe 12 being assembled in serial connections by means of threaded collars. The drill string extends to the surface where it is powered by a rotary drilling rig which rotates a rotary table and allows advance of the drill stem simultaneously. The rotary table (not shown) engages a kelly which is threaded to the top of the drill string. The kelly rotates the drill string in one application of the invention. This rotation is imparted to the full length of pipe attached below so that rotation advances the well borehole. The drill string connects to one or more drill collars 14. A drill collar is a heavy wall pipe which may add stiffness and weight to assure better control of the overall drilling operation. One or more drill collars may be threaded together to provide the requisite amount of weight and to stiffen the drill stem. At the lower end of the drill collars, a mud motor identified by the numeral 16 is also incorporated. The mud motor 16 is powered by the flow of drilling fluid which passes from the surface along the interior of the drill stem from mud pumps (not shown) located at the surface. The mud flows downward through the drill stem and through a portion 17 of the mud motor which contains a rotor-stator assembly and eventually out through the drill bit and is returned to the surface by way of the annular space between the exterior of the pipe and the borehole wall. The mud motor 16 also comprises a bent portion 18 which is often referred to as a "bent" sub. Within the bent portion 18 is housed a shaft and universal joint assembly which transfers the rotation of the rotor/stator to the drill bit by means of a shaft. The angle of the bend at 18 is adjustable at the surface. It is incorporated to cause the well to track at an angle deviating from the vertical under conditions which will be described. The mud motor assembly 16 may be located above the sensor sub 20, or alternately may be located below the sensor sub 20. It is desirable to locate the sensor sub as near the bit as possible given the means for conducting the signals generated therein to the surface since this arrangement more accurately portrays what is happening at the bit-formation interface.

The sensor sub 20 need not be very long, and indeed, the sub 20 is typically only about 1 to 3 feet in length. The apparatus is useful with all types of bits. The wall of the borehole is formed by continued operation of the drill bit 22. Rotation of the drill bit is at least initially imparted from the rotary drilling rig at the surface. While this occurs, drilling fluid flows through the drill stem to lubricate the drill bit, cool the drill bit, provide a hydrostatic pressure head to compensate for pressure of the penetrated formation and to remove cuttings to enable the well borehole to be extended. The continued rotation of the drill string along with the bent sub 18 provides a hole which is drilled substantially straight because the rotation integrates the tendency to deviate, due to the bend, to zero about each revolution.

Control of deviated drilling or "steerage" is affected by the combination of rotations of the entire drill string and separate rotation of the drill bit relative to the drill string. The bend 18 in the mud motor assembly causes the bit to turn, in ever tightening spiral, in the direction that the bend is pointed when the drill string is not rotated and the rotation of the bit 22 is affected by the mud motor 16 which, in turn, is powered by the drilling fluid which is being pumped from the surface through the interior conduit of the drill string 14. Again, the flow of drilling fluid lubricates and cools the drill bit 22 and carries the rock fragments or cuttings to the surface. Slowly rotating the drill string, at a constant rate, as the mud motor 16 provides the major drilling power, results in the negation of the effects of the bend in the mud motor assembly. The result is that the deviation vector integrates to zero with the drill string rotation resulting in an essentially straight borehole. The orientation of the bend in the mud motor assembly may be determined by the inclination of a gravimeter (not shown) from the vertical and by a magnetometer or compass (not shown) to identify the horizontal azimuth. These elements may be augmented by triaxial accelerometers, gravimeters, inclinometers, or rate gyros (not shown) to steer the bit in the desired path with respect to the formation being penetrated. A gamma ray detector (not shown) is also useful in verifying that the bit is cutting within the desired formation. This technique is especially useful in drilling horizontally in a carbonate or sandstone producing formation bounded at the top and bottom by shale. The basic concept of this technique is that the producing formation usually exhibits relatively low natural gamma radiation activity while shales exhibit relatively high natural gamma ray activity. An increase in measured gamma ray activity indicates that the bit is approaching either the upper or the lower shale strata thus deviating from their desired producing formation. In summary, the mud motor rotates when there is sufficient drilling fluid flow to generate a torque that is sufficient to shear the formation at the bit. The bend of the mud motor assembly is oriented to the desired direction for deviation by positioning the bend with rotations of the drill string to give the appropriate orientation from magnetometers, gravimeters, accelerometers, gyros and gamma ray readings. The drill bit 22 then cuts a spiral of decreasing radius as the drill bit rotates on the now "sliding", non-rotating drill string with all drill bit rotation being supplied by the mud motor 16.

In FIG. 1 of the drawings, the sensor sub 20 has been partly broken away to disclose a relatively thick wall 26. A chamber in the wall holds the circuitry 28 for providing power to and receiving signals from the sensors mounted within sub 20, though this could be packaged separately. This circuitry 28 is received in a sealed housing and connects with the telemetry system for transfer of data to the surface of the earth. It may be desirable to encase the circuitry 28 within the chamber in potting material such as foamed epoxy resin or other vibration resistant material to assist in minimizing shock. Suitable seals are also employed to excluding borehole fluids encountered in the harsh drilling environment. The telemetry system delivers data to the surface resulting from measurements obtained by the force sensing apparatus mounted in the sub 20. An alternate embodiment has a second telemetry system integral to the sensor sub to transmit from the rotating side of the mud motor to "mud-pulse", wireline, or other types of data connections to the surface normally above the mud motor. The sensing apparatus responds to a plurality of forces acting upon the drill string 10 in the vicinity of the drill bit 22. These measurements are used to optimize the drilling operation and can also be used to determine certain rock mechanical properties of the earth formation being penetrated by the drill bit 22.

Two embodiments of the present invention will be disclosed. The first embodiment will be referred to as the diaphragm sensor and the second embodiment will be referred to as the full penetration strain sensor. Particular characteristics of each embodiment will become apparent in the following discussions.

Diaphragm Sensors

Figure 2:
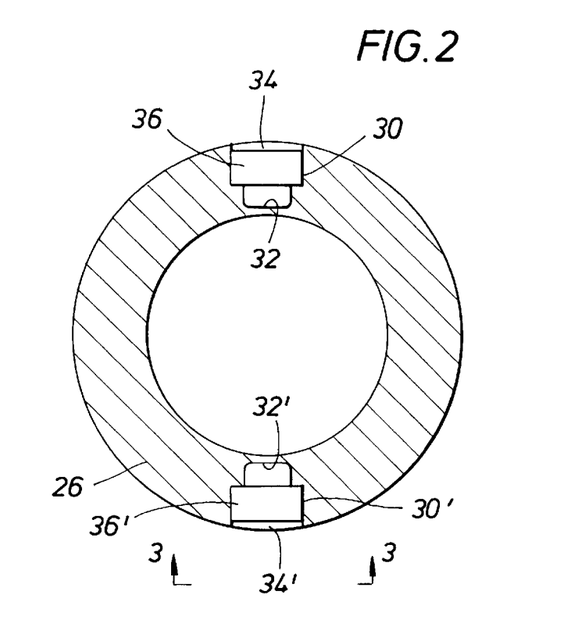
FIG. 2 of the drawings is a sectional view along the line 2—2 of FIG. 1 showing details of construction of recesses formed in the wall of the sensor sub.

Attention is first drawn to the diaphragm sensor embodiment of the invention. Going now to FIG. 2 of the drawings, the thick wall 26 which makes up the cylindrical sub 20 is illustrated in an enlarged view. The passage 30 in the wall 36 of sub 20 forms a chamber 36 which terminates at a thin diaphragm surface 32. For ease of construction, the chamber 36 can be formed of circular internal shape, though discrete separation of force components is aided by a square recess. Chamber 30 is closed by the pressure tight plug 34, coupled so as not to transfer or carry load, at the outer diameter of cylindrical sub 20 thereby sealing chamber 36 from drilling fluid and other borehole environs likely to be encountered in drilling operations. The surface 32 is preferably a flat or planar surface and serves as a mounting surface for one or more measuring devices known as strain gauges which are adhesively attached to the surface 32. The strain gauge is relatively small, typically of 1/64 to 1/4 inch in sensitive grid dimensions of length and width, and will fit within a relatively small chamber 36. The surface 32 is preferably located at a depth so that the wall is relatively thin in that region thereby acting as a diaphragm which collects discrete distortions from forces acting upon the sub 20 at the discontinuities of the recesses. The distortions of the diaphragm are the result of displacements of the preferably square discontinuities in the walls if the cylinder. Stated another way, the distortions of the recess are transmitted by hinge like distortions at the corners of the discontinuities into surface membrane stress in the diaphragm. Typically, the diaphragm thickness is in the range of about 1/8 of an inch or so. If the thickness is greater, sensitivity is reduced while gaining a rugged construction and thereby increasing the environmental limits at which the system can operate. Conversely, sensitivity can be enhanced by making the diaphragm thinner thereby increasing the distortion per unit of applied force but this decreases the environmental limits at which the system can be operated. Forces acting upon cylindrical sub 20 will distort the substantially square discontinuities, the deflections of the walls/corners of which are transmitted to the diaphragms. Distortions in diaphragm 32 will, in turn, vary the resistance of one or more strain gauges affixed thereto. The outputs of the strain gauges are used to define the forces acting upon cylindrical sub 20 as will be detailed in the following discussion. FIG. 2 also shows a preferably identical chamber 36' positioned diametrically opposite chamber 36 with a center line of both chambers 36 and 36' lying on a plane perpendicular to the axis of sub 20. Chamber 36' also comprised a diaphragm 32' which is symmetrical to diaphragm 32 in both dimension and orientation. Strain gauges are likewise adhesively bonded to diaphragm 32'.

Figure 3A:
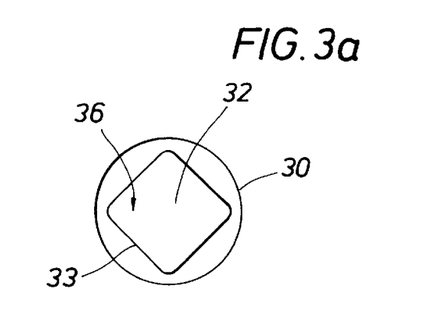
FIG. 3 is a view taken along the line 3—3 shown in FIG. 2 which illustrates details of the recess for sensors.
Figure 3B:
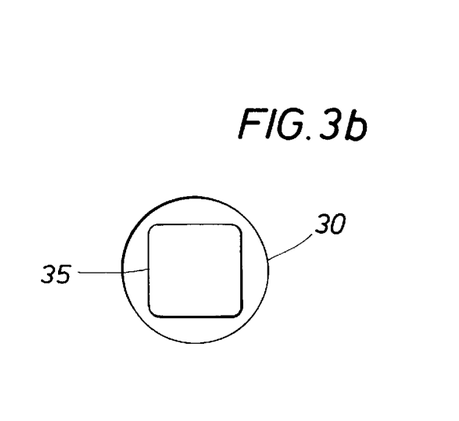

FIG. 3 of the drawings shows the chamber 36 which has the diaphragm area 32 at the bottom of the recess 30. In the preferred embodiment, the face of diaphragm 32 is preferably square and is formed by further machining of the recess 30. The orientation of the diaphragm 32 as well as the orientation of strain gauges mounted on the surface of diaphragm 32 are important aspects of the invention. Two diaphragm orientations are used in the preferred embodiment of the invention and are illustrated in FIG. 3. The first orientation, designated as 33, is such that the sides of the diaphragm 32 form angles of 45 degrees with respect to the axis of sub 20. The second orientation, designated as 35, is such that two sides of diaphragm 32 are parallel to the axis of sub 20. The orientation of the diaphragm, the orientation of the strain gauges mounted thereon, and the processing of the signals from the strain gauges are such as to isolate axial, torque, pressure, bending and shear stresses acting upon sub 20. Details of each measurement will be presented in the following discussion. The measurement of all strain components with the exception of pressure utilize the response of strain gauges mounted on diametrically opposing diaphragms 36 and 36'.

The Axial Bridge

Figure 4:
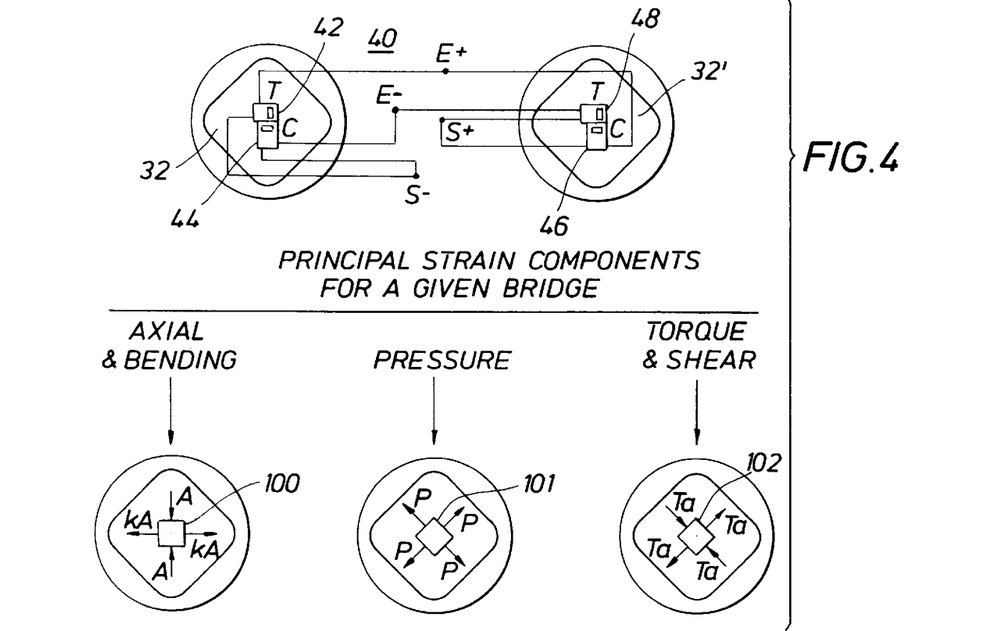
FIG. 4 is a view similar to FIG. 3 of the drawings showing bridge wiring, strain gauge orientations and diaphragm orientations to isolate the axial (WOB) component of stress, and further showing an incremental element of the diaphragm subjected to different types of stress which are identified in the headings adjacent to FIG. 4.
Figure 8:
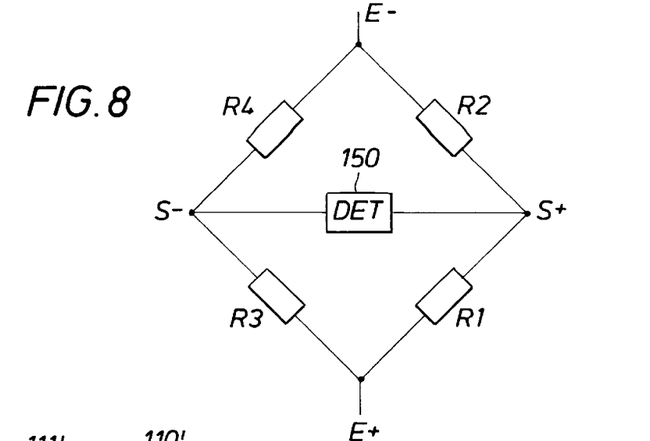
FIG. 8 shows the Wheatstone bridge arrangement used to combine output signals from the strain gauges to isolate the stress component of interest.

Attention is first directed to the measure of axial strain. Two diametrically opposed diaphragms are used with two strain gauges mounted on each diaphragm. The orientation of the diaphragms and the orientation of the strain gauges on each diaphragm are shown in FIG. 4 where the axis of the borehole is vertical. The numeral 40 identifies this particular embodiment. The numerals 42 and 44 identify a first strain gauge and a second strain gauge, respectively, adhesively attached to diaphragm 32. The sensitive axis of strain gauge 42 is horizontal and the sensitive axis of strain gauge 44 is at right angles to that of gauge 42 and is therefore vertical. The sensitive axis is denoted by the long center line shown on the gauge pattern. It should be understood that each strain gauge represents a single electrical resistor with the resistance varying as a function of the strain acting upon the gauge, with each gauge having a nominal resistance value which is considerably larger than the change in resistance induced by the acting strain. Strain gauges which will be referred to as gauges 48 and 46 are mounted on diametrically opposing diaphragm 32' in the same or symmetrical orientation as strain gauges 42 and 44, respectively. The four strain gauges, representing electrical resistors, are configured as four arms R1, R2, R3 and R4 of a Wheatstone bridge as shown in FIG. 8. Terminals of the Wheatstone bridge are identified in FIG. 8 as S+, S−, E+ and E−. For the axial embodiment 40, strain gauges 48, 46, 42 and 44 are represented by resistors R1, R2, R3 and R4, respectively.

Figure 9:
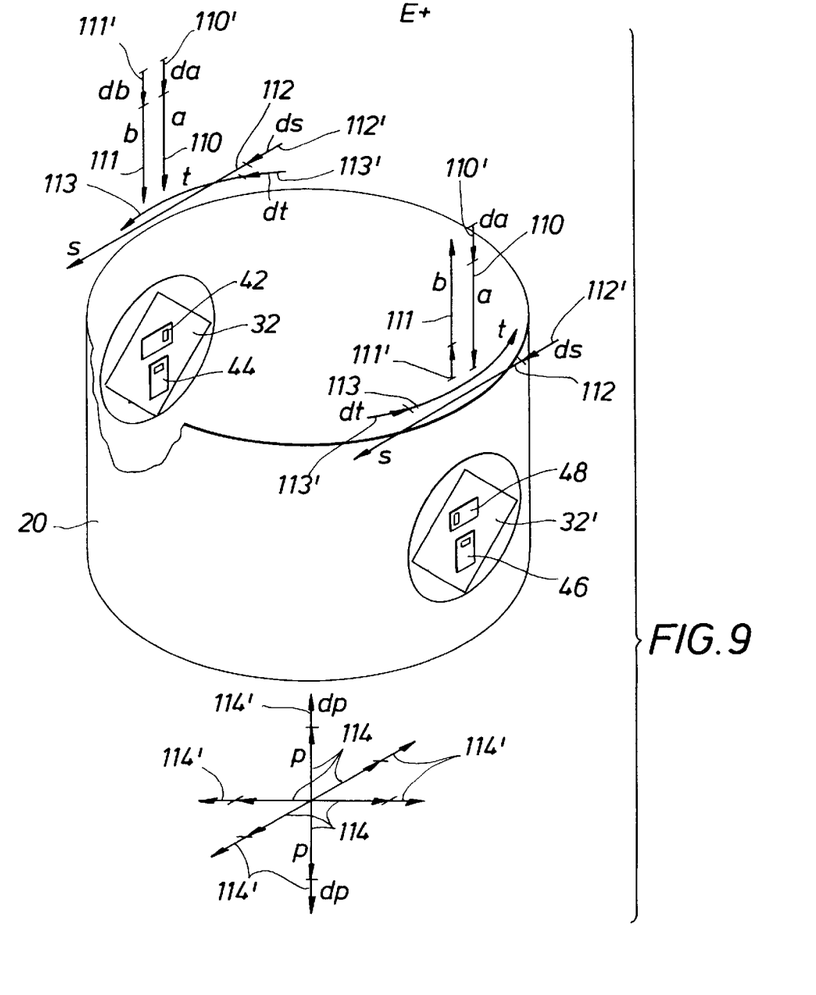
FIG. 9 illustrates the force vectors acting upon the diaphragm and strain gauge assemblies in a drill string sub located in the immediate vicinity of the drill bit.

Recall that the underlying principle of the invention is the distortion of the diaphragms 32 and 32' by force components acting upon sub 20 and the measurement of these distortions using strain gauges. Certain strain components can be isolated by orienting the square diaphragms 32 and 32' such that distortions by the force components of interest is maximized, orienting the strain gauges so as to measure the distortion, and wiring the bridge circuit to detect the desired distorting component. Likewise, the unwanted components are canceled or nulled by a judicious choice of diaphragm orientation, gauge orientation and bridge nulling. Attention is again drawn to FIG. 4 which also illustrates the response of an incremental element of the diaphragms to various strain components. The incremental element 100 illustrates the stress/strain responses of embodiment 40 to axial and bending components. Element 101 illustrates the response to pressure and element 102 illustrates incremental response to both torque and shear. These responses are shown from a three dimensional perspective in FIG. 9. Diametrically opposed diaphragms 32 and 32' are shown on sensor sub 20. Strain gauges 42, 44, 46 and 48 are depicted on their respective diaphragms. The vectors a, t, b, p and s represent the axial, torque, bending, pressure and shear components, respectively, acting on diaphragms 32 and 32'. The vectors a, b, s, p and t are identified by the numerals 110, 111, 112, 114 and 113, respectively. In the example of FIG. 9, an incremental change in the axial, torque, pressure, bending and shear components, designated as da 110', dt 113', dp 114', db 111' and ds 112' respectively, will induce changes in resistors R1, R2, R3 and R4 of the bridge circuit (see FIG. 8), designated as scalar quantities dR1, dR2, dR3, and dR4, respectively. The principal orientations for axial, pressure and bending coincide. Because bending is symmetric, it may be removed directly by the bridge circuit.

The operation of the axial bridge will now be detailed. Assume that for conditions of no load, the resistors of the Wheatstone bridge are such that R1/R2=R3/R4. From the well known operating characteristics of the Wheatstone bridge, no current flow will be observed in the detector 150 when the bridge is "balanced". If an axial force a is applied, the resistances of strain gauges 48 and 44 will change by the amounts dR1=−A and dR4=−A, respectively. The resistances of strain gauges 46 and 42 will change by the amounts dR2=kA and dR3=kA, respectively, where k is defined as Poisson's ratio. For an axial strain, R1/R2≠R3/R4, and a change in voltage is observed across the detector 150 with a magnitude indicative of the magnitude of the applied axial force component a. As mentioned previously, the bridge circuit is designed such that the nominal resistance values of the strain gauges, thus the nominal resistance values of the arms of the Wheatstone bridge, are much, much greater that the changes in the resistance of the gauges resulting from applied force components. For purposes of illustration, assume hypothetical yet typical resistance values of R1=R2=R3=R4=1000 ohms and A=−1.0 ohm and k=0.3. For these values, R1/R2−R3/R4=0.002601. If a torque force t is applied, the principal strains transmitted to the diaphragms 32 and 32' will be at ±45° with respect to the axis of sub 20 as illustrated in FIG. 4. This will result in the same changes in the resistance of strain gauges 48, 46, 42 and 44 therefore no current will flow in the detector 150 resulting from the applied torque t. Stated mathematically, for an applied torque t, dR1=dR2=dR3=dR4=jT where T is proportional to the magnitude of the torque and j is a constant related to the orientation of the diaphragm. For an applied torque, R1/R2=R3/R4. Changes in resistance dR1, dR2, dR3 and dR4 for applied pressure, bending and shear force components are tabulated in Table 1 along with the previously discussed values for axial and torque components. P, B, and S are indicative of the magnitude of the pressure, bending and shear components p, b and s, respectively, and m is a constant. It can be seen that for pressure and shear, R1/R2=R3/R4 therefore the axial embodiment 40 does not respond to these force components. Special mention is made of the response of the axial bridge to bending. For applied bending forces R1/R2≠R3/R4. Using the previously defined hypothetical resistance values of R1=R2=R3=R4=1000 ohms and assuming B=1.0 ohm, R1/R2−R3/R4=0.00000091. Although the bridge is not "mathematically" balanced, the imbalance is several orders of magnitude smaller than the imbalance caused by the applied axial force and is typically less than production variations of the strain gauges themselves. From a practical viewpoint, the bridge is essentially balanced in that R1/R2≈R3/R4 and the axial bridge embodiment 40 is essentially insensitive to bending components.

In summary, the axial bridge embodiment 40 exhibits a voltage change across detector 150 only when exposed to axial forces, and does not respond to other force components. The axial bridge can be calibrated as a function of the magnitude of the axial force which, as an example, might represent the weight on bit. Axial strain is therefore isolated and uniquely detected with the diaphragm orientation, strain gauge orientation, and wiring of the Wheatstone bridge circuit as depicted in embodiment 40.

TABLE 1

BRIDGE RESPONSE

| d Force\d Resist. | AXIAL BRIDGE (Embodiment 40) | | | |
| --- | --- | --- | --- | --- |
|  | dR1 | dR2 | dR3 | dR4 |
| da | −A | +kA | +kA | −A |
| dt | −kA | −kA | −kA | −kA |
| db | −B | +kB | −kB | +B |
| ds | −mS | −mS | +mS | +mS |

Note:
Tension applied to the sensitive axis of the strain gauge decreases resistance It is noted that in FIG. 4, the principal or sensitive axes are defined by the long center lines of the gauges. The larger rectangles show typical strain gauge external physical dimensions and the smaller rectangles are representative of gauge sensitive area size and orientation, but are not restrictive of either. The diaphragms could, in fact, be circular but the square geometry is preferred in order to optimize boundary condition control at the discontinuity, hence at the gauges. The wiring lead diagrams terminate at the gauge terminals. Circles in the lead diagrams are selected as terminals of the Wheatstone bridge but the bridge wiring configuration is not unique as long as R1/R2≠R3/R4 for axial forces and R1/R2=R3/R4 or R1/R2≈R3/R4 for all other force components.

The Torque, Bending and Shear Bridges

Figure 5:
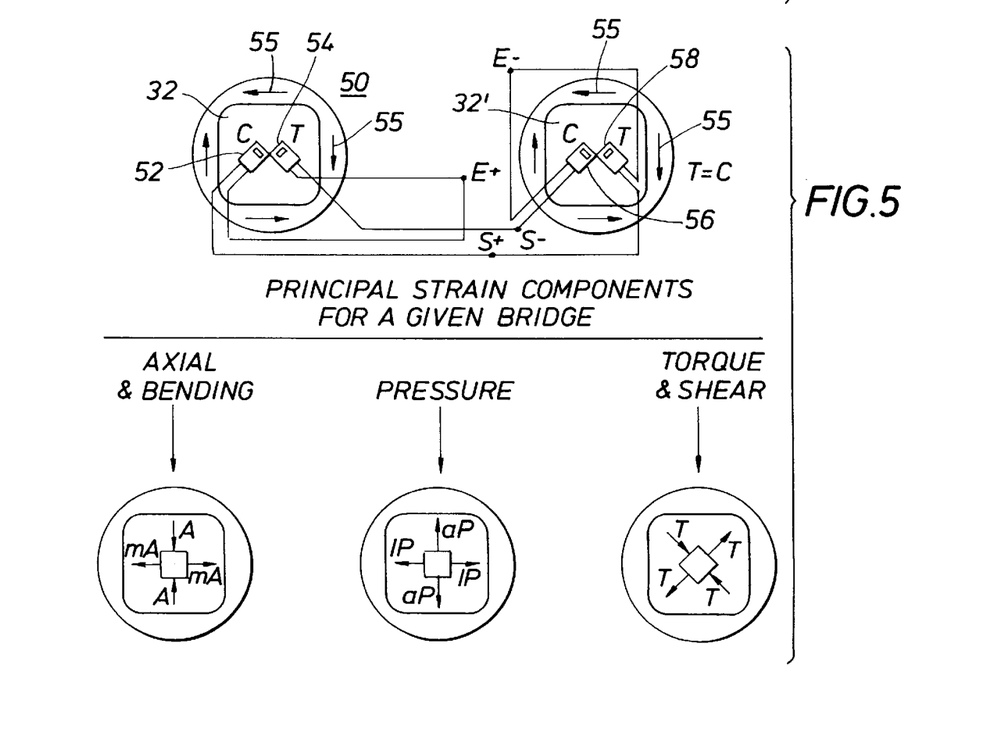
FIG. 5 shows the orientations of the bridge wiring, diaphragm and strain gauge orientations used to isolate the torque component of stress (TOB); and the states of stress resulting from other components of load.
Figure 6:
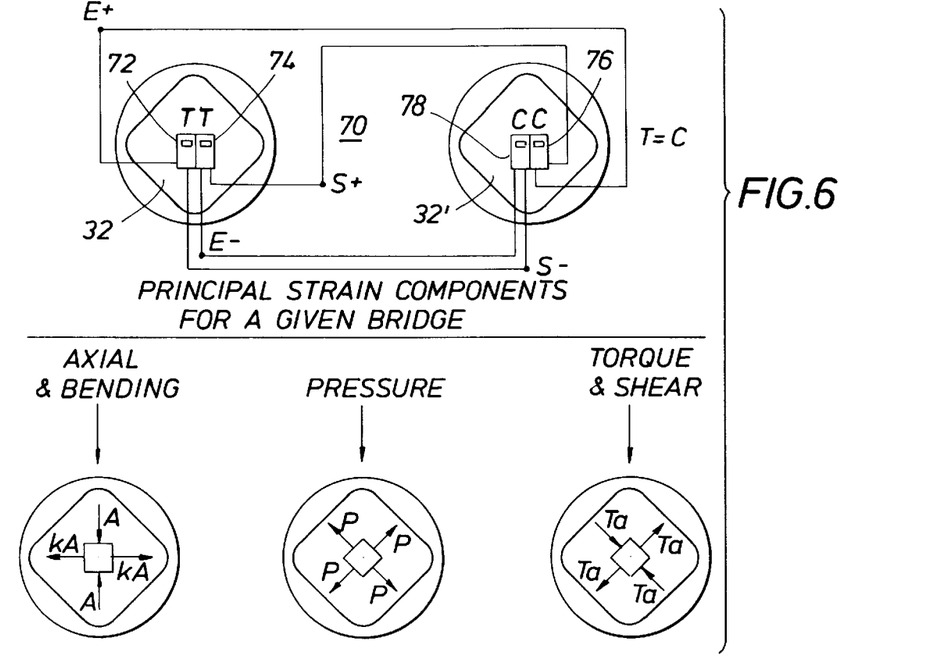
FIG. 6 shows the diaphragm orientations, strain gauge orientations and bridge wiring used to isolate the bending component of stress relative to a given axis through the cross section of the sensor sub; and the states of stress resulting from other components of load.
Figure 7:
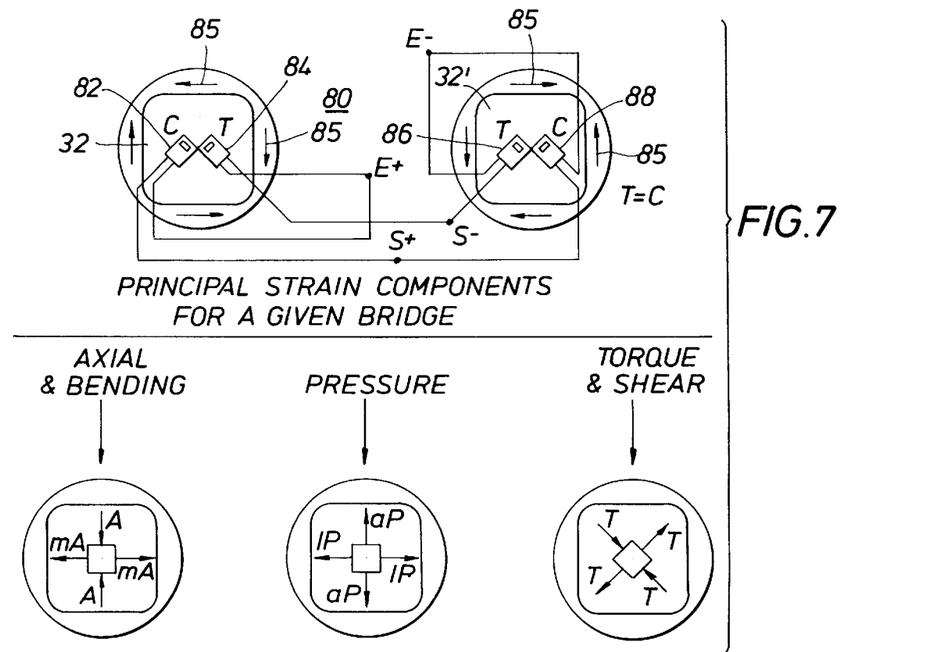
FIG. 7 shows the bridge wiring and the diaphragm and strain gauge orientations used to isolate the beam shear component of stress; and the states of stress resulting from other components of load.

Attention is now directed to the isolation and measurement of other force components that the drill string experiences in the vicinity of the drill bit. In particular, the measurement of torque, bending and shear forces will be discussed in this section. The Wheatstone bridge wiring schemes as well as forces acting upon an increment of diaphragm are illustrated in FIGS. 5, 6, and 7 for torque, bending and shear bridges, respectively. For convenience, the bridge resistor assignments have been summarized in Table 2.

Pertinent information for the torque bridge embodiment, identified by the numeral 50, is detailed in FIG. 5. Strain gauges 52 and 54 are bonded to diaphragm 32 at 45° angles with respect to the axis of sub 20 and strain gauges 56 and 58 are likewise bonded to the diametrically opposing diaphragm 32'. The bending bridge embodiment 70 is illustrated in FIG. 6 with the strain gauges 72 and 74 and gauges 76 and 78 being mounted at 0° with respect to the axis of sub 20 and parallel on opposing diaphragms 32 and 32', respectively. The shear bridge embodiment 80 is illustrated in FIG. 7. For this embodiment, gauge and diaphragm orientation is the same as for the torque bridge embodiment 50. The shear forces, represented by the vectors 85, are reversed on diaphragm 32' when compared with the torque force vectors 55 acting on diaphragm 32' of embodiment 50.

Analyses of the operation of the torque, bending and shear bridges are similar to the analysis of the operation of the axial bridge. Gauge orientations on the diaphragms 32 and 32' and Wheatstone bridge wiring for each bridge are such that R1/R2≠R3/R4 when acted upon by the force component of interest, while R1/R2=R3/R4 or R1/R2≈R3/R4 when acted upon by all other force components. As a result, the force component of interest yields finite readings in the detector 150 of the bridge circuit while other components yield either null or negligible second order responses. It is again noted that the disclosed Wheatstone bridge wirings are not unique. Any bridge resistor assignment is acceptable as long as the component of interest produces a significant bridge imbalance while other components result in either a balanced bridge or an imbalance which is second order and negligible. As stated previously, the orientations of the diaphragms 32 and 32' with respect to the axis of sub 20 are such that boundary condition control and stress component of interest are both maximized.

TABLE 2

DIAPHRAGM STRAIN GAUGE
BRIDGE RESISTOR ASSIGNMENTS

| Embodiment | R1 | R2 | R3 | R4 |
|---|---|---|---|---|
| 40 (Axial) | 48 | 46 | 42 | 44 |
| 50 (Torq.) | 52 | 58 | 54 | 56 |
| 70 (Bend.) | 76 | 74 | 72 | 78 |
| 80 (Sher.) | 82 | 88 | 84 | 86 |

Full Penetration Sensors

A second embodiment of the invention is presented wherein essentially square recesses penetrate entirely the walls of a tubular sub located in the vicinity of the drill bit 22. The individual bridge functions are somewhat simpler in the full penetration embodiment in that the corners of the penetrating recesses act mainly as spring constrained hinges with the bending strains at the corners being sensed by strain gauges which act as arms of a Wheatstone bridge measuring circuit.

Figure 10:
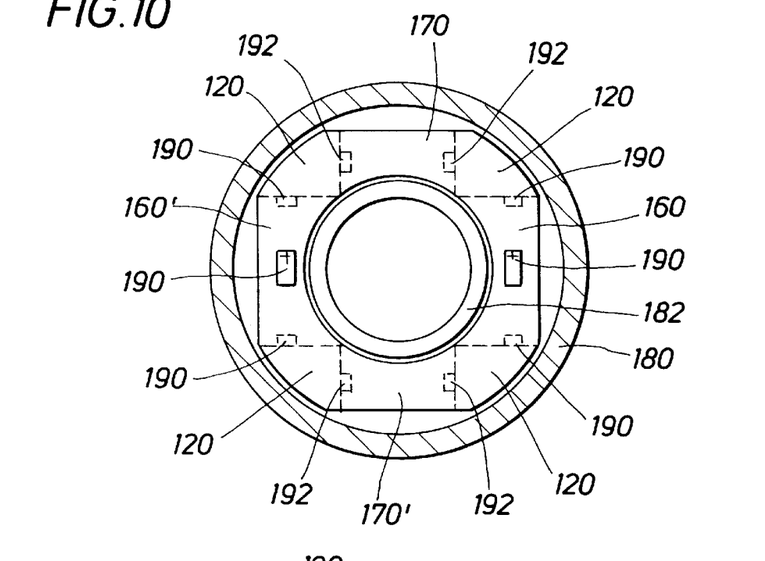
FIG. 10 shows a cross section perpendicular to the axis of a sub in which the full penetration embodiment of the force measuring system has been deployed.

Attention is directed to FIG. 10 which shows a cross section of the drill string in the vicinity of the drill bit 22. Essentially square recesses 160 and 170 penetrate the wall of tubular sub member 120. The recesses are aligned such that two sides are either parallel to the axis of tubular sub 120, as indicated by diametrically opposite recesses 170 and 170', or the sides are at 45° to the axis of tubular sub 120, as indicated by the diametrically opposite recesses 160 and 160'. The tubular members 180 and 182 are outside and inside pressure housings, respectively, which are mechanically "floating" (i.e. they are not redundant load carriers) with respect to the tubular sub 120 and recess assembly. The pressure housings 180 and 182 are preferably sealed to sub 120 with O-rings (not shown) and are installed so as not to provide a redundant load path for any of the components for which isolation is desired. The drilling fluid flows through the conduit defined by the inner pressure tube 182. Strain gauges 190 and 192 are mounted at the flattened corners of recesses 160 and 160', and 170 and 170', respectively, as depicted in FIG. 10. The sensitive axes of strain gauges 190 are shown to be tangential to the radii of the tubular cross section of sub 120.

Figure 11A:
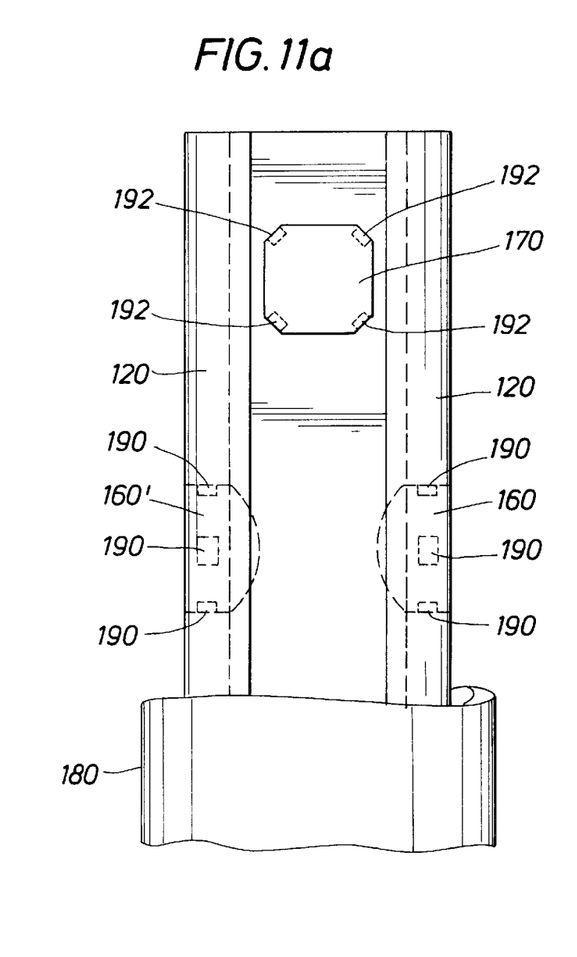
FIG. 11 shows a vertical cross sectional view of a sub in which the full penetration embodiment of the force measuring system has been deployed.
Figure 11B:
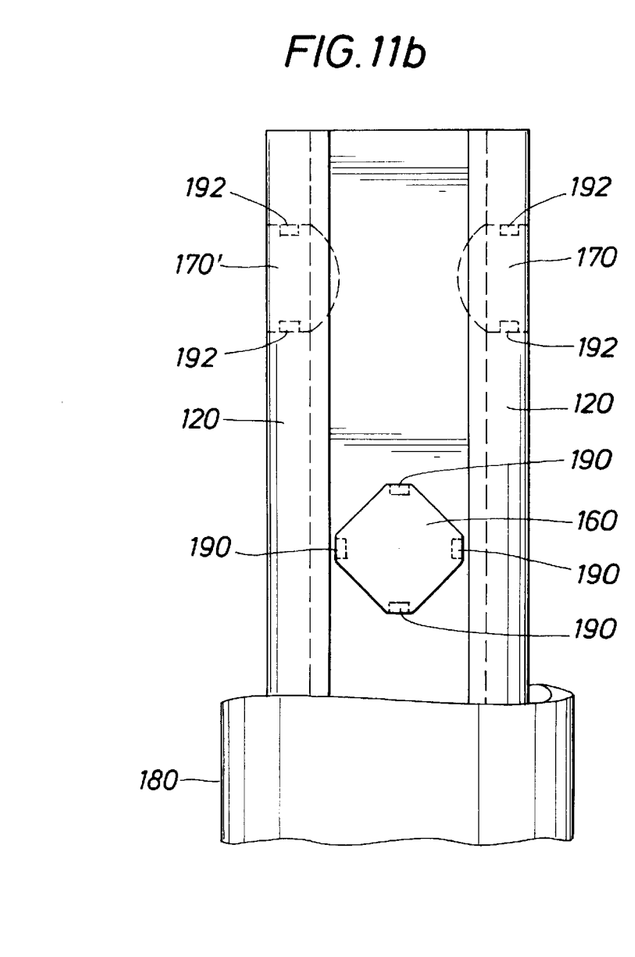

FIG. 11 shows a vertical cross sectional view of the tubular sub 120 and further illustrates the diametrically opposed recesses 160 and 160' as well as recesses 170 and 170'. Pressure tubes 180 and 182 as well as O-ring seals and threads for the recesses have been omitted for clarity. The strain gauges 190 and 192 are shown positioned on the flat corners of recesses 160 and 160', and 170 and 170', respectively.

Figures 12A, 12B:
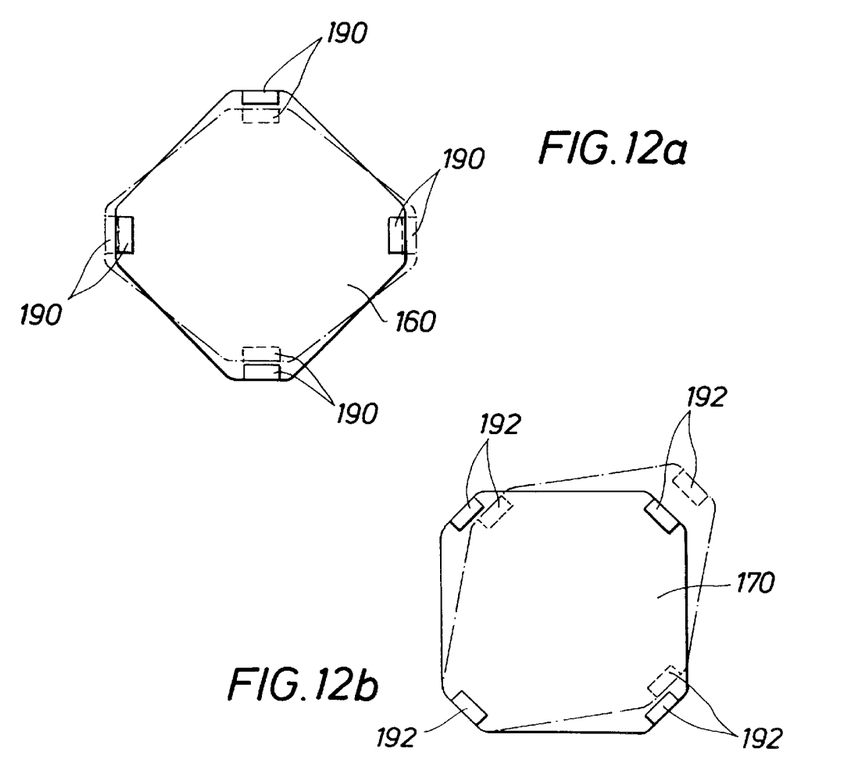
FIG. 12 illustrates displacement of full penetration elements resulting from axial and shear strain components.

FIGS. 12a and 12b illustrates greatly exaggerated strain induced distortions of recesses 160 and 170 resulting from the loading of the elements. FIG. 12a shows the orientation used to isolate axial and bending components. Loading shortens the vertical axis of the essentially square discontinuity and the strain gauges 190 mounted on plane surfaces at the corners of the square respond to these distortions. FIG. 12b shows the orientation used to isolate torsion and shear components. In this configuration, these forces of interest elongate one axis at 45° with respect to the axis of tubular sub 120 while the orthogonal axis is shortened. Again, strain gauges mounted at the planar corners respond to the distortion of the recess element.

In general, plane bending distortions induce symmetrical strains on the plane surfaces at the corners of the square recesses. Numerous strain gauge orientations at the flats of the corners of the squares, for four or eight bridge configurations, are feasible with the Wheatstone bridge wiring configurations determined by the sense of diagonally opposed strain gauge pairs, possibly with series connections to average the strains on recesses diametrically opposite each other. In general, compressive strains occur at the ends of diagonals that are elongated, and tensile strains occur at the ends of diagonals that are shortened. The bridge may be configured to generate primary signals (R1/R2≠R3/R4) while keeping asymmetrical resistance changes from non-primary parameters either null (R1/R2=R3/R4) or restricted to second order effects (R1/R2≈R3/R4).

While the foregoing is directed to the preferred embodiments of the present invention, other and further embodiments of the invention may be devised without departing from the basic scope thereof, and the scope thereof is determined by the claims which follow.

What is claimed is:

1. An apparatus for measuring force and moment components, comprising:
   (a) a subsection comprising an elongated tubular member;
   (b) one or more discontinuities within said elongated tubular member which are distorted by force or moment components, wherein each said one or more discontinuities
      (i) forms a flat surface in a plane which is parallel to the major axis of said elongated tubular member, and
      (ii) wherein said surface is substantially square thereby forming four corners;
   (c) one or more strain gauges affixed to each of said discontinuities such that the response of said one or more strain gauges are functions of distortions of said discontinuities transmitted by hinge like distortions of said corners within said plane, and are indicative of the type and magnitude of force or moment component acting upon said subsection;
   (d) circuitry for measuring the responses of said pluralilty of strain gauges; and
   (e) a computer for converting said measures of responses of said plurality of strain gauges into the types and the magnitudes of forces components acting upon said subsection.

2. The apparatus of claim 1 wherein one or more of said plurality of essentially squared surfaces are oriented such that two sides are parallel to said major axis of said elongated subsection.

3. The apparatus of claim 2 wherein one or more of said plurality of essentially squared surfaces are oriented such that the sides are at forty five degrees with respect to said major axis of said elongated tubular member.

4. The apparatus of claim 3 wherein said plurality of essentially squared surfaces comprise essentially square diaphragms comprising a bottom surface plane parallel to the major axis of said elongated tubular member, and wherein said bottom surface plane is driven by the discrete deflections of the squared recess discontinuities.

5. The apparatus of claim 4 wherein one or more strain gauges are affixed to said flat surfaces of said essentially square diaphragms.

6. The apparatus of claim 5 wherein two strain gauges are affixed symmetrically about the center of the flat surface of each of two diaphragms, and wherein;
   (a) said centers of said diaphragms are on an axis which is perpendicular to the major axis of said elongated tubular member;
   (b) said diaphragms are positioned on opposite sides of said elongated tubular member;
   (c) sensitive axes of each pair of strain gauges on each said diaphragm are parallel to one another and parallel to the major axis of said elongated tubular member; and
   (d) the sides of both essentially square diaphragms are at forty five degrees with the major axis of said elongated tubular member, wherein
   (e) said strain gauges respond to bending moment induced distortions at said diaphragms transmitted by said hinge like distortions of said corners.

7. The apparatus of claim 5 wherein two strain gauges are affixed symmetrically about the center of the flat surface of each of two diaphragms, and wherein;
   (a) said centers of said diaphragms are on an axis which is perpendicular to the major axis of said elongated tubular member;
   (b) said diaphragms are positioned on opposite sides of said elongated tubular member;
   (c) sensitive axes of each pair of strain gauges on each diaphragm are at ninety degrees with respect to the other and the axis of one strain gauge is parallel to the major axis of said elongated tubular member; and
   (d) the sides of both essentially square diaphragms are at forty five degrees with respect to the major axis of said elongated tubular member, wherein
   (e) said strain gauges respond to axial force induced distortions of said diaphragms transmitted by said hinge like distortions at said corners.

8. The apparatus of claim 5 wherein two strain gauges are affixed symmetrically about the center of the flat surface of each of two diaphragms, and wherein;
   (a) said centers of said diaphragms are on an axis which is perpendicular to the major axis of said elongated tubular member;
   (b) said diaphragms are positioned on opposite sides of said elongated tubular member;
   (c) sensitive axes of each pair of strain gauges on each diaphragm are at ninety degrees with respect to the other and are at forty five degrees with respect to the major axis of said elongated tubular member; and
   (d) two sides of both essentially square diaphragms are parallel to the major axis of said elongated tubular member, wherein
   (e) said strain gauges respond to torque and shear induced distortions of said diaphragms transmitted by said hinge like distortions at said corners.

9. The apparatus of claim 6 wherein said responses of said strain gauges are combined using said computer to determine the bending moment acting upon said elongated tubular member.

10. The apparatus of claim 7 wherein said responses of said strain gauges are combined using said computer to determine the axial force acting upon said elongated tubular member.

11. The apparatus of claim 8 wherein said responses of said strain gauges are combined using said computer to determine torque acting upon said elongated tubular member.

12. The apparatus of claim 8 wherein said responses of said strain gauges are combined using said computer to determine shear force acting upon said elongated tubular member.

13. The apparatus of claim 3 wherein said plurality of discontinuities comprises essentially square recesses which penetrate said wall of said elongated tubular member, wherein said recesses are distorted by said hinge like distortions resulting from forces applied thereto.

14. The apparatus of claim 13 wherein strain gauges are affixed to one or more flattened corners of said essentially square recesses and wherein said strain gauges respond to distortions of said one or more square recesses as a function of the type and the magnitude of forces applied to said elongated tubular member.

15. The apparatus of claim 14 wherein said strain gauge responses are combined using said computer to obtain the magnitude of forces acting upon said elongated tubular member comprising torque, axial force, shear force and bending moment.

16. The apparatus of claim 1 wherein said elongated tubular member comprises a subsection of drill string which is positioned in the vicinity of a drill bit affixed to one end of said drill string.

17. The apparatus of claim 1 wherein said means for measuring the responses of said plurality of strain gauges to the types and the magnitudes of force components acting upon said elongated tubular member comprises a Wheatstone bridge.

18. A method for measuring force components, comprising:
   (a) providing a subsection comprising an elongated tubular member;
   (b) providing one or more discontinuities within said subsection which are distorted by force components acting upon said subsection, wherein said each of said one or more discontinuities
      (i) forms a flat surface in a plane which is parallel to the major axis of said elongated tubular member, and
      (ii) wherein said surface is substantially square thereby forming four corners;
   (c) affixing one or more strain gauges to each of said discontinuities such that the responses of said one or more strain gauges are functions of distortions of said discontinuities transmitted by hinge like distortions within said plane at said corners, and are indicative of the type and magnitude of force components acting upon said discontinuity;
   (d) measuring the responses of said one or more strain gauges; and
   (e) converting said measures of responses of said one or more strain gauges into the types and magnitudes of force components acting upon said subsection.

19. The method of claim 18 wherein said provided plurality of discontinuities comprise essentially square diaphragms with flat surfaces recessed within the wall of said elongated tubular member.

20. The method of claim 19 further comprising the step of affixing one or more strain gauges to each said flat surfaces of each said essentially square diaphragm.

21. The method of claim 20 further comprising the steps of affixing two strain gauges symmetrically about the center of each flat surface of two diaphragms, and further comprising:
   (a) centering said diaphragms on an axis which is perpendicular to the major axis of said elongated tubular member;
   (b) positioning said diaphragms on opposite sides of said elongated tubular member;
   (c) orienting sensitive axes of each pair of strain gauges on each said diaphragm such that said sensitive axes are parallel to one another and parallel to the major axis of said elongated tubular member;
   (d) orienting said essentially square diaphragms such that the sides of both are at forty five degrees with the major axis of said elongated tubular member, wherein said strain gauges respond to bending moment induced distortions of said diaphragms transmitted by said hinge like distortions at said corners; and
   (e) combining the responses of said strain gauges to determine the bending moment acting upon said elongated tubular member.

22. The method of claim 20 further comprising the steps of affixing two strain gauges symmetrically about the center of each flat surface of two diaphragms, and further comprising:
   (a) centering said diaphragms on an axis which is perpendicular to the major axis of said elongated tubular member;
   (b) positioning said diaphragms on opposite sides of said elongated tubular member;
   (c) orienting sensitive axes of each pair of strain gauges on each diaphragm at ninety degrees with respect to the other and with the axis of one strain gauge parallel to the major axis of said elongated tubular member;
   (d) orienting the sides of both said essentially square diaphragms at forty five degrees with respect to the major axis of said elongated tubular member, wherein said strain gauges respond to axial force induced distortions of said diaphragms transmitted by said hinge like distortions at said corners; and
   (e) combining the responses of said strain gauges to determine the axial force acting upon said elongated tubular member.

23. The method of claim 20 further comprising the steps of affixing two strain gauges symmetrically about the center of each flat surface of two diaphragms, and further comprising:
   (a) centering said diaphragms on an axis which is perpendicular to the major axis of said elongated tubular member;
   (b) positioning said diaphragms on opposite sides of said elongated tubular member;
   (c) orienting sensitive axes of each pair of strain gauges on each diaphragm at ninety degrees with respect to the other and at forty five degrees with respect to the major axis of said elongated tubular member;
   (d) orienting both essentially square diaphragms such that two sides of each essentially square diaphragm are parallel to the major axis of said elongated tubular member, wherein said strain gauges respond to torque and shear induced distortions of said diaphragms transmitted by said hinge like distortions at said corners; and
   (e) combining the responses of said strain gauges to determine torque acting upon said elongated tubular member.

24. The method of claim 20 further comprising the steps of affixing two strain gauges symmetrically about the center of each flat surface of two diaphragms, and further comprising:
   (a) centering said diaphragms on an axis which is perpendicular to the major axis of said elongated tubular member;
   (b) positioning said diaphragms on opposite sides of said elongated tubular member;
   (c) orienting said sensitive axes of each pair of strain gauges on each diaphragm at ninety degrees with respect to the other and at forty five degrees with respect to the major axis of said elongated tubular member;
   (d) orienting both essentially square diaphragms such that two sides of each essentially square diaphragm are parallel to the major axis of said elongated tubular member; and
   (e) combining the responses of said strain gauges to determine shear forces acting upon said elongated tubular member.

25. The method of claim 21 wherein said responses of said strain gauges are combined using said computer to determine the bending moment acting upon said elongated tubular member.

26. The method of claim 22 wherein said responses of said strain gauges are combined using said computer to determine the axial force acting upon said elongated tubular member.

27. The method of claim 23 wherein said responses of said strain gauges are combined using said computer to determine torque acting upon said elongated tubular member.

28. The apparatus of claim 24 wherein said responses of said strain gauges are combined using said computer to determine shear force acting upon said elongated tubular member.

29. The method of claim 20 wherein said provided plurality of discontinuities comprises essentially square recesses which penetrate said wall of said elongated tubular member, wherein said recesses are distorted by said hinge like distortions resulting from forces applied thereto.

30. The method of claim 29 further comprising the step of affixing strain gauges to one or more flattened corners of said essentially square recesses such that said one or more strain gauges respond to distortions of said one or more square recesses as a function of the type and magnitude of force applied to said elongated tubular member.

31. The method of claim 30 wherein said strain gauge responses are combined to obtain the magnitude of forces acting upon said elongated tubular member, wherein said forces comprising torque, axial force, shear force and bending moment.

32. The method of claim 18 wherein said provided elongated tubular member comprises a subsection of a drill string, with said subsection being positioned in the vicinity of a drill bit which terminates one end of said drill string.

33. The method of claim 18 wherein said method for measuring the responses of said plurality of strain gauges to force components acting upon said subsection comprises a Wheatstone bridge.

* * * * *